United States Patent
Lim et al.

(10) Patent No.: US 12,555,142 B2
(45) Date of Patent: Feb. 17, 2026

(54) METHOD, SYSTEM, AND RECORDING MEDIUM TO PROVIDE COMMUNITY NATIVE ADVERTISING

(71) Applicant: NAVER CORPORATION, Seongnam-si (KR)

(72) Inventors: Sang Hyun Lim, Seongnam-si (KR); Gyung Jin Bae, Seongnam-si (KR); Sang-A Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 18/473,781

(22) Filed: Sep. 25, 2023

(65) Prior Publication Data

US 2024/0104609 A1 Mar. 28, 2024

(30) Foreign Application Priority Data

Sep. 27, 2022 (KR) .................. 10-2022-0122760

(51) Int. Cl.
*G06Q 30/0241* (2023.01)
*G06Q 30/0251* (2023.01)
*G06Q 30/0273* (2023.01)

(52) U.S. Cl.
CPC ..... *G06Q 30/0277* (2013.01); *G06Q 30/0251* (2013.01); *G06Q 30/0275* (2013.01)

(58) Field of Classification Search
CPC .......... G06Q 30/0277; G06Q 30/0251; G06Q 30/0275
USPC .................. 705/14.73; 706/12; 707/711
See application file for complete search history.

(56) References Cited

U.S. PATENT DOCUMENTS

| | | | |
|---|---|---|---|
| 10,152,731 B1* | 12/2018 | Cselle | G06Q 30/0277 |
| 11,062,358 B1* | 7/2021 | Lewis | G06Q 50/01 |
| 2010/0057569 A1* | 3/2010 | Cantelmo | G06Q 30/00 705/14.55 |
| 2012/0102021 A1* | 4/2012 | Hill | G06F 16/9535 707/711 |
| 2015/0066635 A1 | 3/2015 | Valin et al. | |
| 2015/0220833 A1* | 8/2015 | Le | G06N 3/04 706/16 |
| 2015/0278387 A1* | 10/2015 | Stergiou | G06Q 30/0277 705/14.73 |

(Continued)

FOREIGN PATENT DOCUMENTS

| | | |
|---|---|---|
| CN | 110473011 A | 11/2019 |
| JP | 2022036924 A | 3/2022 |

(Continued)

OTHER PUBLICATIONS

Outbrain, What is Native Advertising, Internet Archive Way Back Machine Capture date of May 5, 2019 from URL https://www.outbrain.com/native-advertising/ (Year: 2019).*

(Continued)

*Primary Examiner* — Tarek Elchanti
(74) *Attorney, Agent, or Firm* — Greer Burns & Crain Ltd.

(57) ABSTRACT

An advertising method may include registering an advertising material and targeting information; determining at least one community corresponding to the targeting information; and controlling the advertising material to be exposed in the form of native content on the community.

11 Claims, 10 Drawing Sheets

(56) References Cited

U.S. PATENT DOCUMENTS

| | | | |
|---|---|---|---|
| 2016/0125314 A1* | 5/2016 | Mulukutla | G06Q 30/0277 |
| | | | 706/12 |
| 2019/0065620 A1* | 2/2019 | Murray | G06F 16/2474 |
| 2020/0034689 A1* | 1/2020 | Andrassy | G06N 3/044 |
| 2020/0153700 A1* | 5/2020 | Fox | H04L 41/145 |

FOREIGN PATENT DOCUMENTS

| | | |
|---|---|---|
| KR | 1020110025486 A | 3/2011 |
| KR | 1020160004227 A | 1/2016 |
| KR | 1020160006301 A | 1/2016 |
| KR | 1020170072176 A | 6/2017 |
| KR | 101896668 B1 | 9/2018 |
| TW | 202046211 A | 12/2020 |

OTHER PUBLICATIONS

Taboola, What is Native Advertising, Internet Archive Way Back Machine Capture date of May 20, 2019 from URLhttps://taboola.com/native-advertising (Year: 2019).*

Hubspot, 9 Native Advertising Examples People Actually Enjoyed Reading, Internet Archive Way Back Machine Capture date of Jul. 20, 2019 from URL https://blog.hubspot.com/marketing/native-advertising-examples (Year: 2019).*

Ava Sirrah, Guide to Native Advertising, 2019 (Year: 2019).*

Office Action issued in corresponding to Korean patent application No. 10-2022-0122760, dated Apr. 8, 2024.

Office Action issued in corresponding Japanese patent application No. 2023-140681, dated Aug. 6, 2024.

Search report issued in corresponding to Taiwanese patent application No. 112132641, dated Sep. 12, 2024.

* cited by examiner

METHOD, SYSTEM, AND RECORDING MEDIUM TO PROVIDE COMMUNITY NATIVE ADVERTISING

CROSS-REFERENCE TO RELATED APPLICATION(S)

This U.S. non-provisional application claims the benefit of priority under 35 U.S.C. § 119 to Korean Patent Application No. 10-2022-0122760 filed on Sep. 27, 2022, in the Korean Intellectual Property Office (KIPO), the entire contents of which are incorporated herein by reference.

BACKGROUND OF THE INVENTION

Field of Invention

One or more example embodiments of the present invention in the following description relate to technology for providing an advertisement through a community.

Description of Related Art

A rapid increase in the number of high-speed communication network users enables the development of various services and diversification of service items through a communication network.

As the number of advertisements is rapidly increasing as one of service items, various technologies for providing various types of advertisements are being developed.

As an example of technology for providing an advertisement, technology for providing an advertisement using a video is described in Korean Patent Laid-Open Publication No. 10-2016-0004227, published on Jan. 12, 2016.

BRIEF SUMMARY OF THE INVENTION

One or more example embodiments may expose an advertisement registered to an advertising platform in the form of native content of a corresponding community through the community.

One or more example embodiments may expose an advertisement of an advertiser in the form of a post or a comment on a community rather than in a separate advertising area.

One or more example embodiments may provide an interaction function through a comment on an advertisement exposed in the form of native content of a community.

One or more example embodiments may identify a topic in units of a community, a bulletin board within the community, or a post included in the community or the bulletin board and may use the topic for advertising targeting.

According to at least one example embodiment, there is provided an advertising method performed by a computer system, wherein the computer system includes at least one processor configured to execute computer-readable instructions included in a memory, and the advertising method includes registering, by the at least one processor, an advertising material and targeting information; determining, by the at least one processor, at least one community corresponding to the targeting information; and controlling, by the at least one processor, the advertising material to be exposed in the form of native content on the community, through the community.

The registering may include registering the advertising material for each type of advertising that is classified according to a type of the native content.

The registering may include registering the advertising material as an advertising material element corresponding to a constituent element of the native content.

The registering may include setting at least one of a target page and a target topic in community unit or bulletin board unit that is a sub-communication space within the community.

The determining may include determining, based on a target topic, a post related to the target topic as an advertising page using a community related to the target topic, a bulletin board related to the target topic that is a sub-communication space within the corresponding community, or a post related to the target topic that is a post included in the community or the bulletin board.

With respect to each of the community, the bulletin board, and the post available as the advertising page, a topic of each page may be classified through an artificial intelligence (AI)-based machine learning model based on meta information of a corresponding page.

The controlling may include controlling the advertising material to be exposed in the form of a post or a comment on the community.

The controlling may include controlling the advertising material to be exposed based on a bid ranking on a corresponding community page when there is a plurality of advertisements that uses the community as a target page.

A comment function may be allowed as an interaction function for an advertisement exposed in the form of the native content.

The advertising method may further include receiving, by the at least one processor, a comment on the advertisement exposed in the form of the native content from the community and providing a report related to the comment.

According to at least one example embodiment, there is provided a non-transitory computer-readable recording medium storing instructions that, when executed by a processor, cause the processor to perform the advertising method.

According to at least one example embodiment, there is provided a computer system including at least one processor configured to execute computer-readable instructions included in a memory, wherein the at least one processor is configured to execute a process of registering an advertising material and targeting information; a process of determining at least one community corresponding to the targeting information; and a process of controlling the advertising material to be exposed in the form of native content on the community through the community.

According to some example embodiments, it is possible to provide a new type of advertising by exposing an advertisement registered to an advertising platform in the form of native content of a corresponding community through the community.

According to some example embodiments, it is possible to provide an advertisement of an advertiser as natural content without a sense of heterogeneity by exposing the advertisement of the advertiser in the form of a post or a comment on the community rather than in a separate advertising area.

According to some example embodiments, it is possible to effectively verify a user reaction to an advertisement by providing an interaction function through a comment on the advertisement exposed in the form of native content of a community.

According to some example embodiments, it is possible to maximize marketing effect by identifying a topic in units of a community, a bulletin board within the community, or a post included in the community or the bulletin board and by using the topic for advertising targeting to target a space suitable for an advertising purpose.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
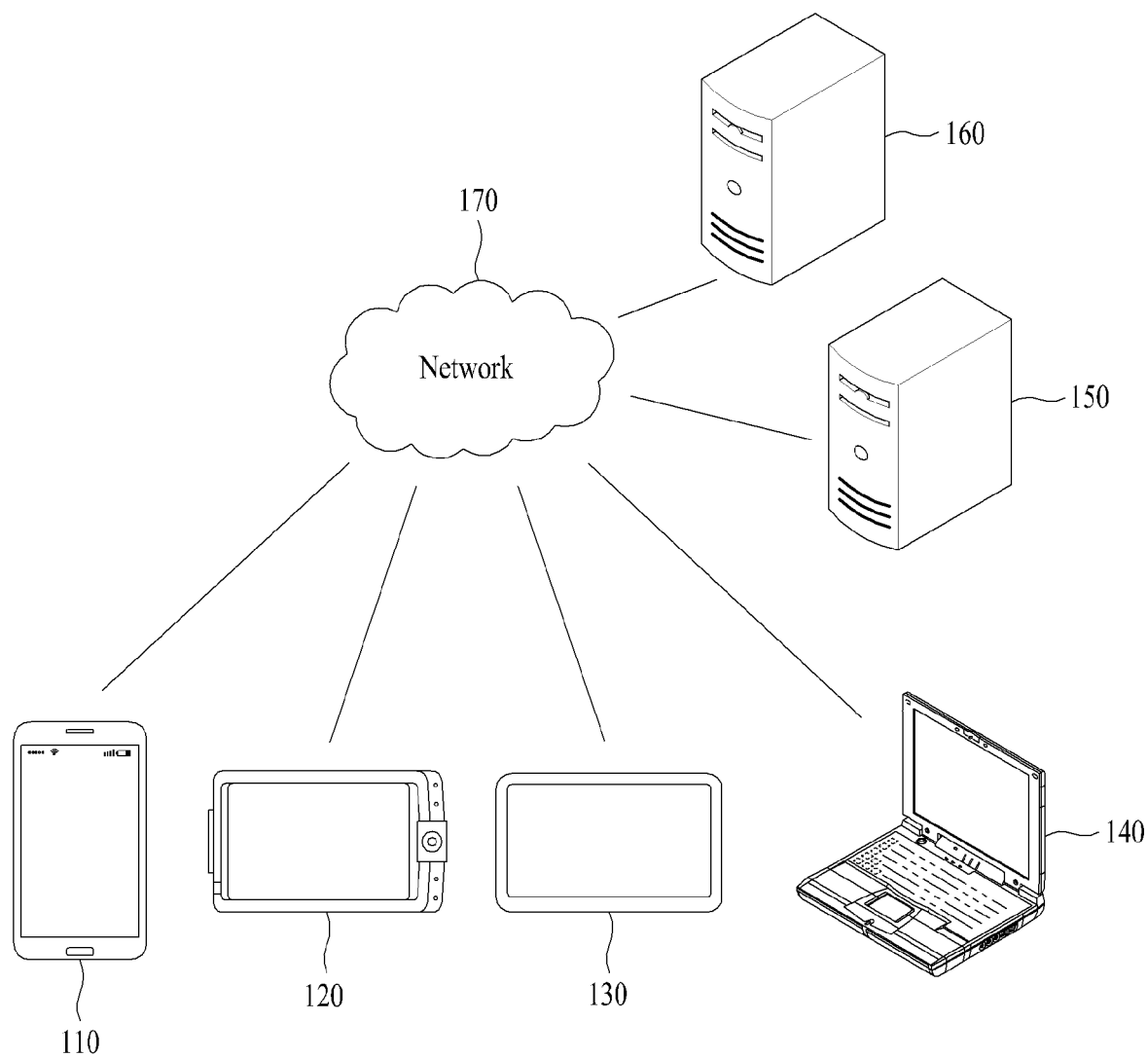
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for providing an advertisement through a community.

The example embodiments including disclosures in detail may expose, that is, display an advertisement registered to an advertising platform in the form of native content, such as real content on a community.

A community native advertising system according to the example embodiments may be implemented by at least one computer system and a community native advertising method according to the example embodiments may be performed through the at least one computer system included in the community native advertising system. Here, a computer program according to an example embodiment may be installed and executed on the computer system, and the computer system may perform the community native advertising method according to the example embodiments under control of the executed computer program. The aforementioned computer program may be stored in a computer-readable storage medium to computer-implement the community native advertising method in conjunction with the computer system.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170. In detail, for example, the server 150 may provide a service, for example, an advertising management service, desired by a corresponding application to the plurality of electronic devices 110, 120, 130, and 140, as the first service through the application as a computer program that is installed and executed on the plurality of electronic devices 110, 120, 130, and 140. As another example, the server 160 may provide a service for distributing a file for installation and execution of the aforementioned application to the plurality of electronic devices 110, 120, 130, and 140 as the second service.

Figure 2:
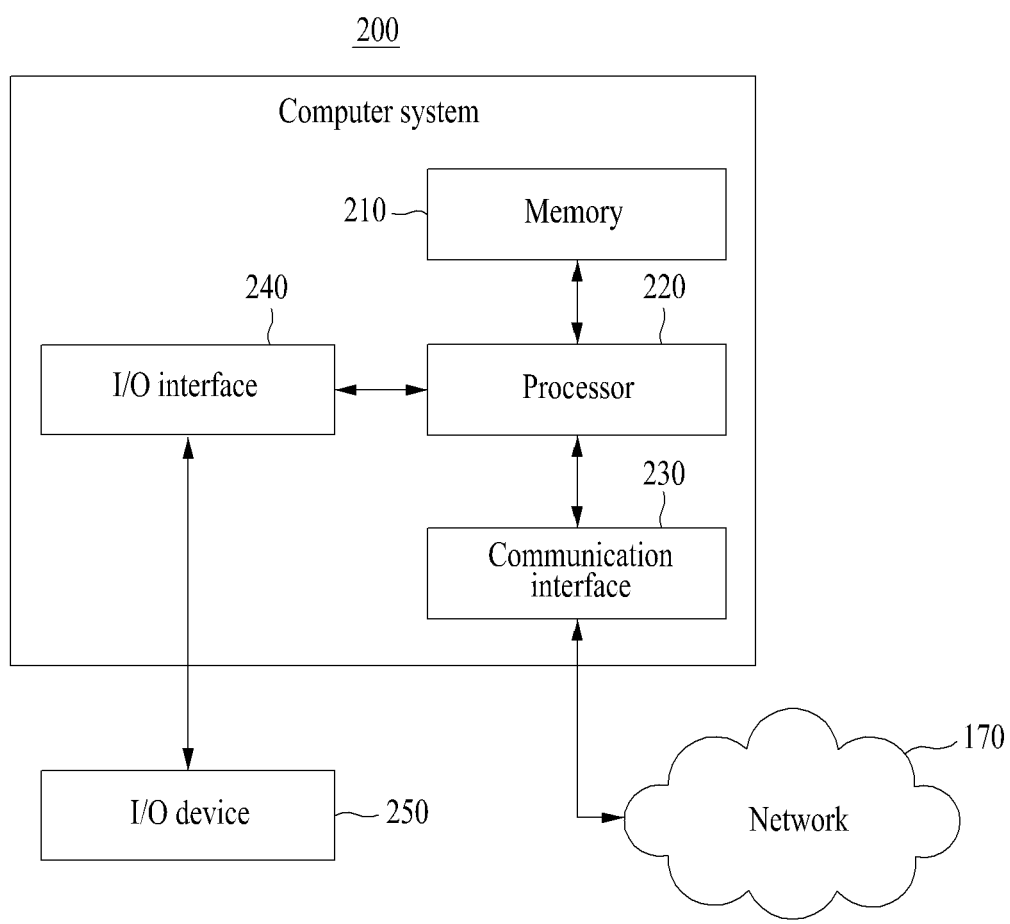
FIG. 2 is a diagram illustrating an example of a computer system according to at least one example embodiment.

FIG. 2 is a block diagram illustrating an example of a computer system according to at least one example embodiment. Each of the plurality of electronic devices 110, 120, 130, and 140 or each of the servers 150 and 160 may be implemented by a computer system 200 of FIG. 2.

Referring to FIG. 2, the computer system 200 may include a memory 210, a processor 220, a communication interface 230, and an input/output (I/O) interface 240.

The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer system 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer system 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication system 200 and another device, for example, the aforementioned storage devices, over the network 170. For example, the processor 220 of the computer system 200 may forward a request or an instruction created based on a program code stored in the storage device such as the memory 210, data, and a file, to other devices over the network 170 under the control of the communication interface 230. Inversely, a signal, an instruction, data, a file, etc., from another device may be received at the computer system 200 through the communication interface 230 of the computer system 200 over the network 170. For example, a signal, an instruction, data, etc., received through the communication interface 230 may be forwarded to the processor 220 or the memory 210, and a file, etc., may be stored in a storage medium, for example, the permanent storage device, further includable in the computer system 200.

The I/O interface 240 may be a device used for interfacing with an I/O device 250. For example, an input device of the I/O device 250 may include a device, such as a microphone, a keyboard, a mouse, etc., and an output device of the I/O device 250 may include a device, such as a display, a speaker, etc. As another example, the I/O interface 240 may be a device for interfacing with a device in which an input function and an output function are integrated into a single function, such as a touchscreen. The I/O device 250 may be configured as a single device with the computer system 200.

According to other example embodiments, the computer system 200 may include greater or less number of components than those shown in FIG. 2. For example, the computer system 200 may include at least a portion of the I/O device 250, or may further include other components, for example, a transceiver, a database, etc.

Hereinafter, example embodiments of a method and a system for providing community native advertising are described.

Although a large number of community services are present on the Internet, there is no platform capable of meeting marketing needs through community integration according to diversities of formats and topics.

The example embodiments relate to technology capable of using a community of various formats or topics as an advertising page.

Herein, the term "community" refers to a space on the Internet in which user experiences on various topics are shared and may inclusively represent a space in which people having a common matter of experience or environment communicate through various communication functions, for example, chat, a posting or a post, a note, and a comment.

The community may include an internal community operated with a platform included in the computer system 200 (e.g., café, band, and OpenChat operated by Naver) and an external community capable of interworking with the computer system 200 as a system separate from the computer system 200.

The computer system 200 according to an example embodiment may provide an advertising management service to a client through connection to a dedicated application installed on the client and a web site/mobile site related to the computer system 200.

The processor 220 may control the computer system 200 to perform operations included in a community native advertising method described below. For example, the processor 220 and the components of the processor 220 may be implemented to execute an instruction according to a code of at least one program and a code of an OS included in the memory 210.

The processor 220 may read a necessary instruction to which instructions related to control of the computer system 200 are loaded. In this case, the read instruction may include an instruction for controlling the processor 220 to perform the following community native advertising method.

Operations included in the following community native advertising method may be performed in order different from illustrated order and a portion of operations may be omitted. Alternatively, an additional process may be further included.

Operations included in the community native advertising method may be performed by the server 150. Depending on example embodiments, at least a portion of operations may be performed by the client or a community server, for example, the server 160.

Figure 3:
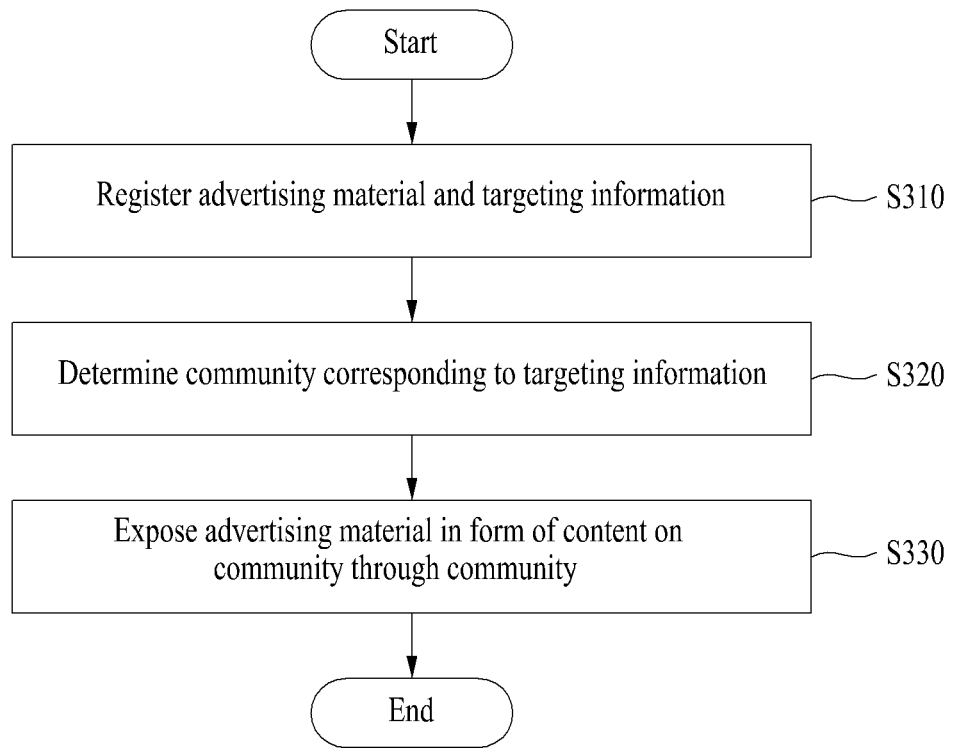
FIG. 3 is a flowchart illustrating an example of an advertisement providing method performed by a computer system according to at least one example embodiment.

FIG. 3 is a flowchart illustrating an example of a method performed by a computer system according to at least one example embodiment.

Referring to FIG. 3, in operation S310, the processor 220 may register an advertising material and targeting information through an advertising platform. The processor 220 may register an advertising material element of a corresponding type for each type of advertising through input or setting of an advertiser. The type of advertising may be classified into a type of native content that is exposed through a community and may include, for example, a type of advertising in which an advertisement is exposed in the form of a post of a community ((hereinafter, referred to as a post type) and a type of advertising in which an advertisement is exposed in the form of a comment on a post of a community (hereinafter, referred to as a comment type). An advertising material element to be registered to the advertising platform may be determined based on a constituent element of native content, for example, a post and a comment. The community native content may include a profile element that represents author information and a body element that represents body content. Therefore, the processor 220 may request the advertiser to register an advertising material corresponding to the profile element and the body element according to the constituent element of the community native content. The processor 220 may register a target option for the advertising material through input or setting of the advertiser. The processor 220 may set a target page matching unit in units of a community, such as an internal community or an external community, and may set the target page matching unit in units of a bulletin board that is a sub-communication space within the community. Depending on example embodiments, the processor 220 may set the target page matching unit in units of a post included in the community or the bulletin board. The processor 220 may also set the target page matching unit and a topic desired to target as targeting information on the advertising material.

In operation S320, the processor 220 may determine at least one community corresponding to the targeting information on the corresponding advertising material as an advertising page for exposing the advertising material. For example, the processor 220 may determine a community in which content with a topic identical or similar to a targeting topic is posted based on the targeting topic set by the advertiser. Here, the processor 220 may determine the advertising page in a community unit, a bulletin board unit, or a post unit according to the target page matching unit. The advertising page may be automatically determined based on the targeting topic. Also, the advertiser may directly select the advertising page in the community unit, the bulletin board unit, or the post unit.

In operation S330, the processor 220 may control the advertising material registered by the advertiser to be exposed in the form of native content on the corresponding community through the community determined in operation S320. The processor 220 may construct and expose the advertising material registered to the advertising platform as a native user interface (UI) of the community determined as the target page. That is, the processor 220 may construct and expose the advertising material in the form of content of the corresponding community to fit a community page. For example, in the case of registering the advertising material to the advertising platform, the processor 220 may register the advertising material as a post within the server 150 and may also expose a title of a corresponding advertisement and an element required for a corresponding page UI in a post list of the community, through a community native UI. In response to a selection from the user on an advertising post from the post list of the community, the processor 220 may provide a post verification and comment registration function through redirection to the registered post within the server 150.

As another example, in the case of registering the advertising material to the advertising platform, the processor 220 may immediately register the advertising material in the form of a native post within the community. In response to a selection from the user on an advertising post from the post list of the community, the processor 220 may provide the post verification and comment registration function by exposing an advertising body within the community. The processor 220 may provide an interaction function by allowing a comment on a post-type advertisement exposed in the community as providing an interactable advertisement through the community. The processor 220 may allow registration of a comment on an advertisement exposed as a post on the community and may manage the registered post through the advertising platform. A comment registered to the advertisement exposed as the post on the community and source information of the corresponding comment (the community in which the comment is registered) may be transmitted to the server 150 and the processor 220 may provide a report function capable of verifying a comment for each source at a time through the advertising platform. The processor 220 may provide a function that allows an advertiser to register a comment or a nested comment through redirection to a community post to which a specific comment is registered in response to a selection on the specific comment from a comment report.

When the target page is an internal community, the processor 220 may directly construct and expose the advertising material registered by the advertiser as a native UI of the internal community. Meanwhile, when the target page is an external community, the processor 220 may transmit the advertising material registered by the advertiser to the external community and may request the corresponding advertisement to be posted. Here, the external community may construct and expose the advertising material transmitted from the server 150 as the native UI of the corresponding community regardless of the advertiser's subscription in conjunction with the server 150.

Figure 4:
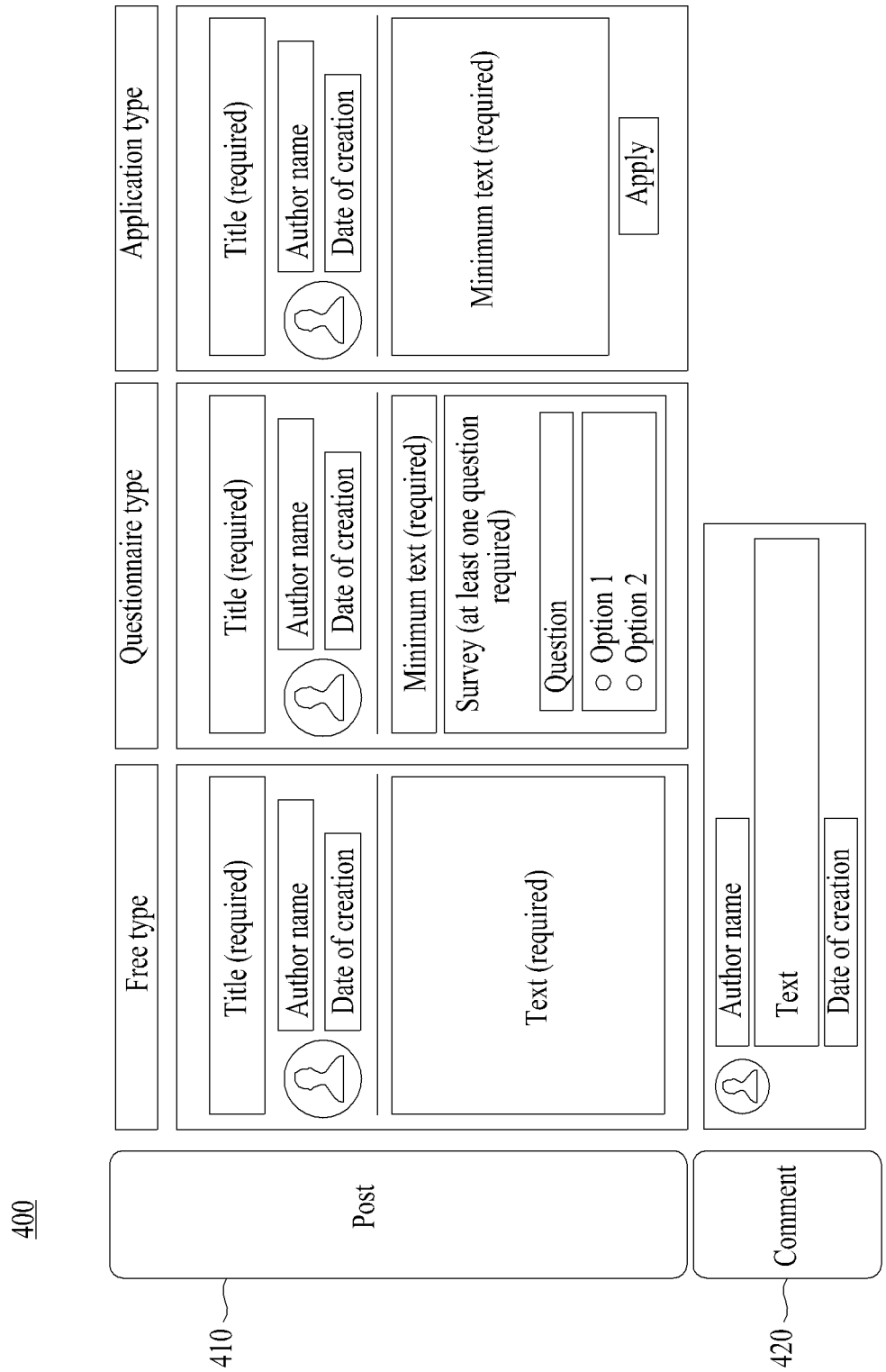
FIG. 4 illustrates an example of native content of a community according to at least one example embodiment.

FIG. 4 illustrates an example of native content of a community according to at least one example embodiment.

Referring to FIG. 4, native content 400 posted on a community may include a post 410 and a comment 420 on the post 410.

The post 410 may include a profile element representing author information (e.g., a profile image and an author name) and a body element representing body content (e.g., a title and a description), and may be classified into various types, such as a free type, a questionnaire type, and an application type.

The comment 420 may include a profile element representing author information and a comment element representing comment contents.

Figure 5:
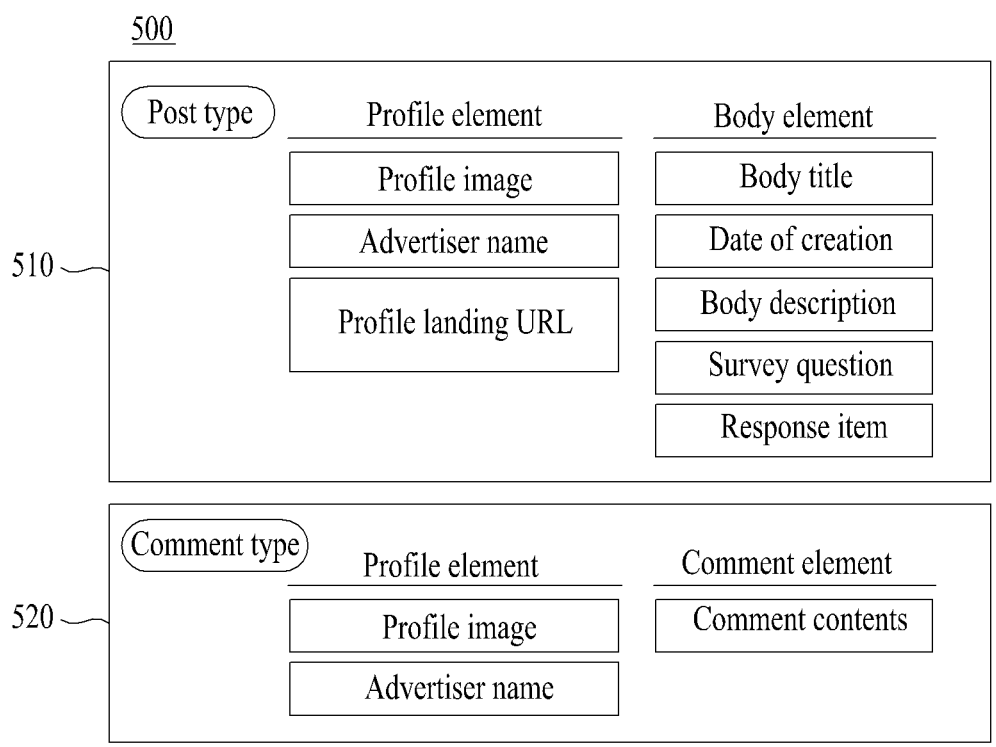
FIG. 5 illustrates an example of an advertisement registration interface screen according to at least one example embodiment.

FIG. 5 illustrates an example of an advertisement registration interface screen according to at least one example embodiment.

The processor 220 may provide an advertisement registration interface screen 500 for registering an advertising material to be exposed through a community.

Referring to FIG. 5, the advertisement registration interface screen 500 may be configured as an interface capable of registering an advertising material according to the constituent element of a community available as an advertising page.

The advertisement registration interface screen 500 may include an interface for registering an advertising material for each type of advertising. For example, the type of advertising may include a post-type advertisement 510 and a comment-type advertisement 520.

The post-type advertisement 510 may include an interface for registering a profile element, for example, a profile image of an advertiser, an advertiser name, and a profile landing page uniform resource locator (URL), and an interface for registering a body element, for example, a body title, a body description, a survey question, and a response item. In the case of the post-type advertisement 510, a plurality of templates, such as a free type, a questionnaire type, and an application type may be present and an interface for registering an advertising material element may be differently constructed according to a post type.

The comment-type advertisement 520 may include an interface for registering a profile element, for example, a profile image of an advertiser and an advertiser name, and an interface for registering a comment element, for example, advertising contents.

To register an advertisement that targets a community in an advertising platform, an interface for registering an advertising material element corresponding to a constituent element of native content of the corresponding community may be provided.

In addition to the post-type advertisement 510 and the comment-type advertisement 520, a type of advertising that is inserted into a body of the post that is posted on the community may be further included.

In the case of a body-embedded advertisement, a profile element, such as advertiser name, and a body element, such as advertising contents including an outlink URL capable of being redirected to an advertising landing page, may be registered as the advertising material.

Figure 6:
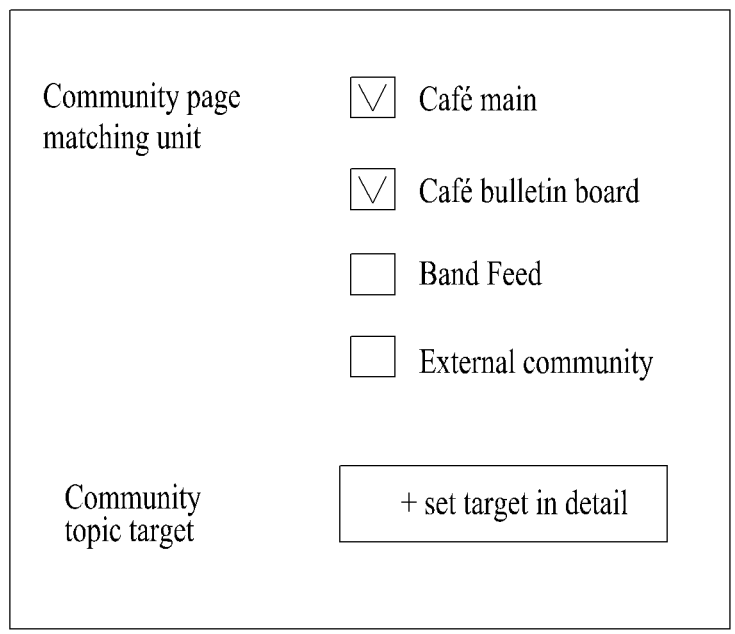
FIG. 6 illustrates an example of a target option registration interface screen according to at least one example embodiment.

FIG. 6 illustrates an example of a target option registration interface screen according to at least one example embodiment.

Referring to FIG. 6, the advertisement registration interface screen 500 may include a target option registration interface 610 for registering a target option for an advertising material.

The target option registration interface 610 refers to an interface screen for registering targeting information on the advertising material and may include an interface for setting a target page matching unit of a community unit, a bulletin board unit, or a post unit and an interface for setting a target topic.

The processor 220 may provide a community list and/or a bulletin board list that may be used as an advertising page through the target option registration interface 610 and may also provide a targetable topic option.

The processor 220 may apply advertising targeting by community unit and also by bulletin board unit within a community or by post unit within the community or the bulletin board and may also apply advertising targeting based on a topic.

Figure 7:
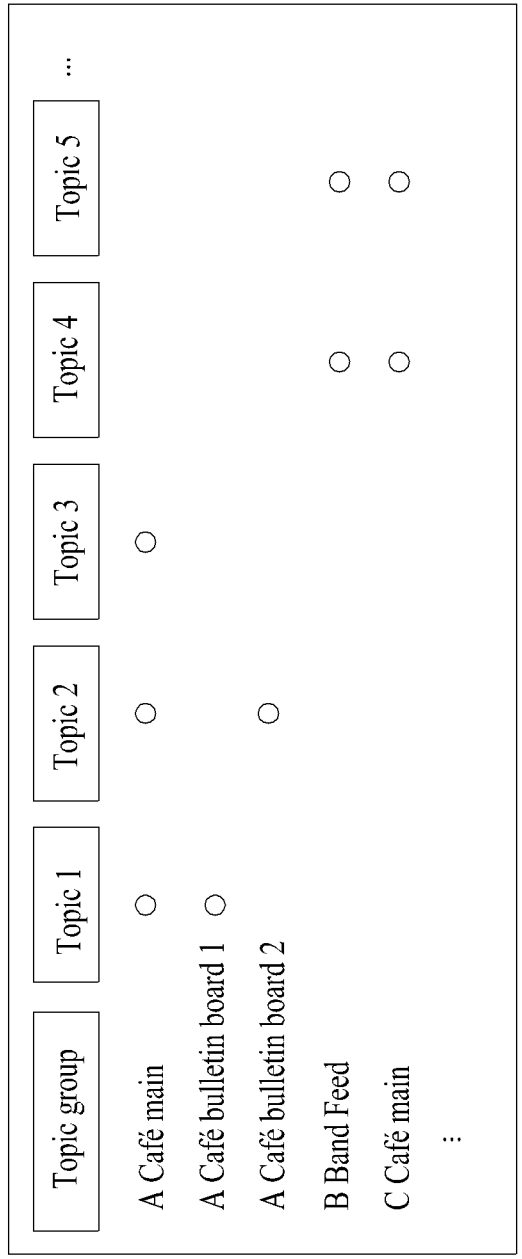
FIG. 7 illustrates an example of a topic-based targeting according to at least one example embodiment.

FIG. 7 illustrates an example of a topic-based targeting according to at least one example embodiment.

The processor 220 may classify a topic available as a targeting condition based on meta information of a community page. Referring to FIG. 7, the processor 220 may classify a topic of each page through meta information of a corresponding page with respect to pages with different hierarchies, such as a community, a bulletin board within the community, and a post within the community or the bulletin board.

For example, the processor 220 may apply topic-based advertising targeting by collecting meta information of a community, a bulletin board, or a post or content posted on a corresponding page and by identifying a topic through AI-based machine learning. The processor 220 may expose an advertisement by optimally matching at least one of a community, a bulletin board, and a post having a high correlation to a targeting topic.

For example, the processor 220 may train an AI model for a topic classification by using a title of a community and a title or body contents of a post posted on the corresponding community as a learning data pair and may use a community classified using a target topic of an advertiser as an advertising page. The processor 220 may use a community of a professional topic, such as vehicle café and cosmetic café, as an advertising page.

Depending on example embodiments, if a body of a post contains inappropriate contents, such as violence, the processor 220 may apply negative targeting to limit advertisement exposure.

Figure 8:
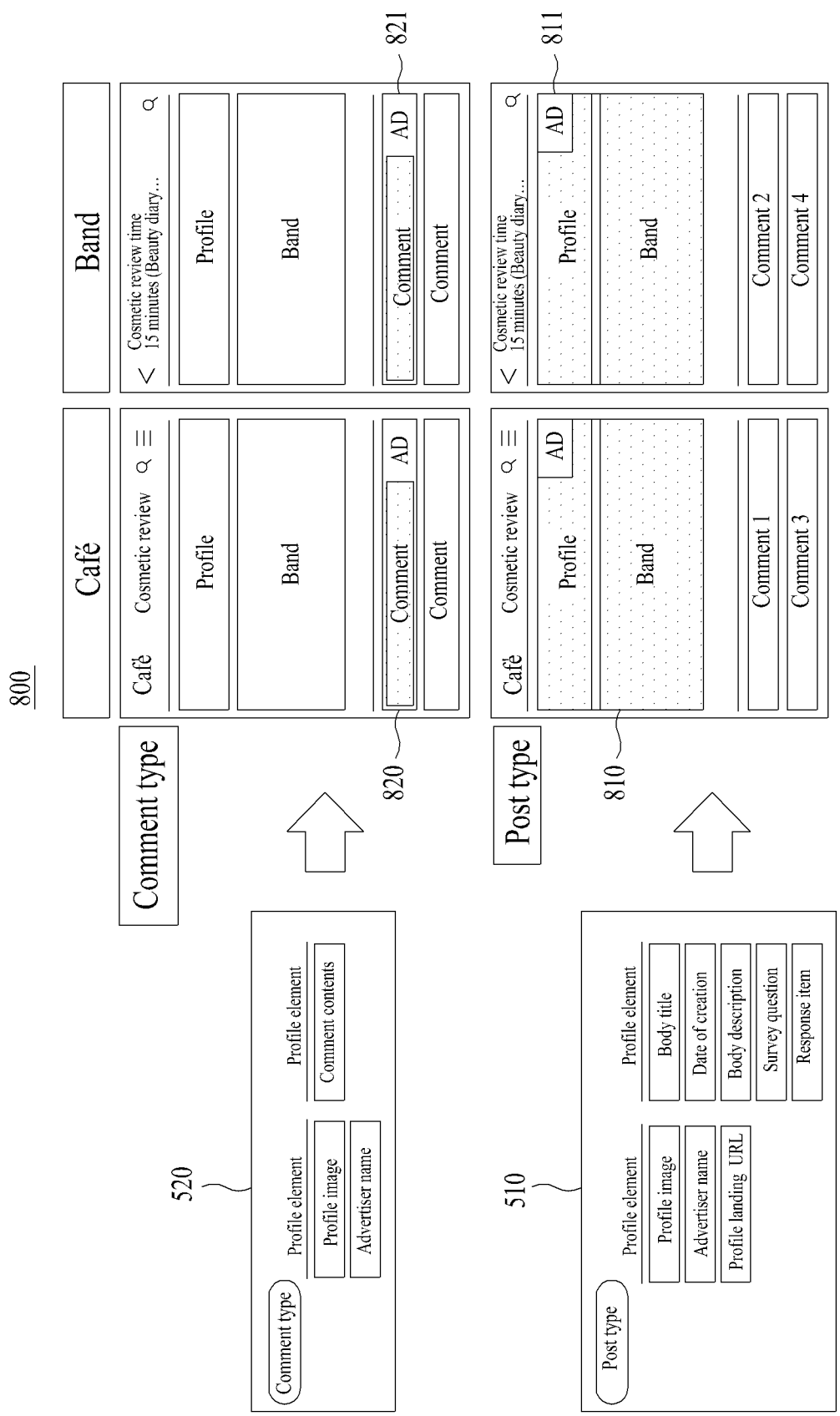
FIG. 8 illustrates an example of exposing community native advertising according to at least one example embodiment.

FIG. 8 illustrates an example of exposing community native advertising according to at least one example embodiment.

When an advertising material is registered through the advertisement registration interface screen 500, the processor 220 may expose the advertising material in the form of native content of a community determined as an advertising page of a corresponding advertisement. The processor 220 may control the advertising material to be exposed according to a content UI of each page.

Referring to FIG. 8, the processor 220 may expose an advertising material registered as the post-type advertisement 510 as a post 810 on a community page 800 and may expose an advertising material registered as the comment-type advertisement 520 as a comment 820 on the community page 800.

The post 810 and the comment 820 corresponding to advertisements among contents on the community page 800 may include AD marks 811 and 821 representing advertisements, respectively. Depending on example embodiments, a display element capable of distinguishing an advertisement from other contents may be applied in addition to the AD marks 811 and 821.

Instead of exposing advertisements in a common form, the processor 220 may expose an advertisement through a native UI of a corresponding community according to the community corresponding to a target page when an advertiser registers material element to an advertising platform. That is, the processor 220 may provide an advertisement in a community native form in which a UI and a driving environment identical to those of content posted on the community are applied.

Therefore, although an advertiser who desires to post an advertisement is not a community member, the processor 220 may post the advertisement in the same form as that of content (post or comment) actually posted by a community member to the corresponding community.

The processor 220 may control an advertisement to be exposed or not to be exposed on the community page 800 according to advertisement ON/OFF setting by the advertiser. That is, the processor 220 may change an advertising material exposure state according to an advertisement ON/OFF setting.

The processor 220 may collectively control an exposure status for all advertisements according to a setting of the advertiser or may individually control an exposure status for each advertisement.

The advertisement, for example, the post 810 and the comment 820, exposed in the form of native content on the community may include an advertiser profile. Here, the advertiser profile refers to an advertiser-only profile that operates only in an advertising material and may represent an advertising-only profile of an advertising account. A URL capable of moving to a landing page set by the advertiser in response to a selection on the advertiser profile may be included.

Figure 9:
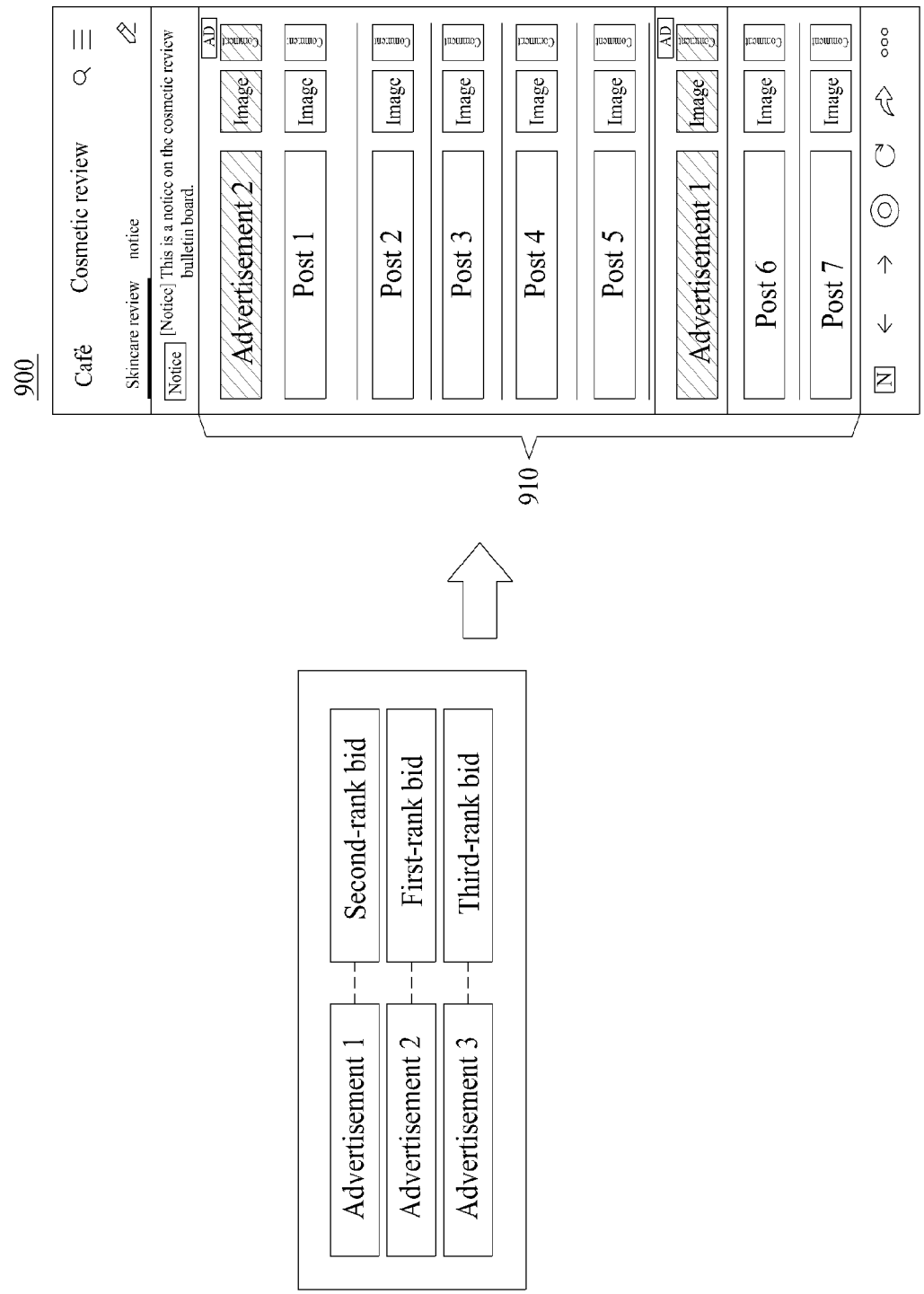
FIG. 9 illustrates an example of exposing bidding-based community native advertising according to at least one example embodiment.

FIG. 9 illustrates an example of exposing bidding-based community native advertising according to at least one example embodiment.

When a plurality of advertisements targets the same topic or the same page among advertising materials registered as post-type advertisements, the processor 220 may expose the advertising materials based on bid rankings on a community page.

For example, referring to FIG. 9, when advertisement 1, advertisement 2, and advertisement 3 are a second-rank bid, a first-rank bid, and a third-rank bid, respectively, the processor 220 may expose advertising materials on a community page 900 in order of advertisement 2, advertisement 1, and advertisement 3.

The processor 220 may expose advertising materials according to bid rankings at intervals of a predetermined number of posts in a post list 910 on the community page 900. For example, the processor 220 may expose one post-type advertisement for every five general posts in the post list 910.

Advertisement redirection may be limited until a movement from the post list 910 loaded on the community page 900 to another screen is completed.

Also, in the case of returning to the post list 910 after redirection to a detailed page of a specific post included in the post list 910, or in the case of scrolling the post list 910, an exposure location for each advertising material according to a bid ranking (determined, for example, based on bidding prices, such as in keyword bidding) may be fixed.

Figure 10:
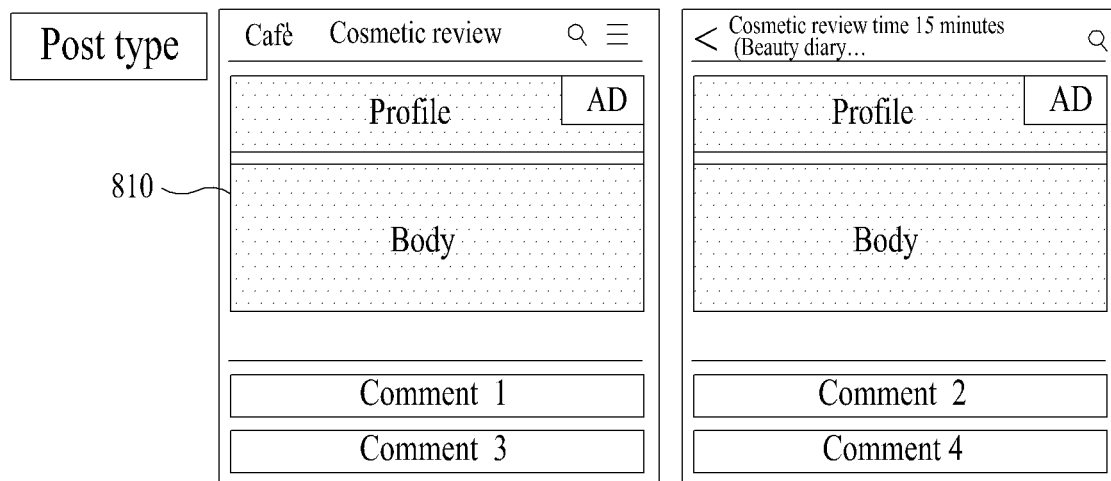
FIG. 10 illustrates an example of a screen for a comment management function according to at least one example embodiment.
Figure 10:
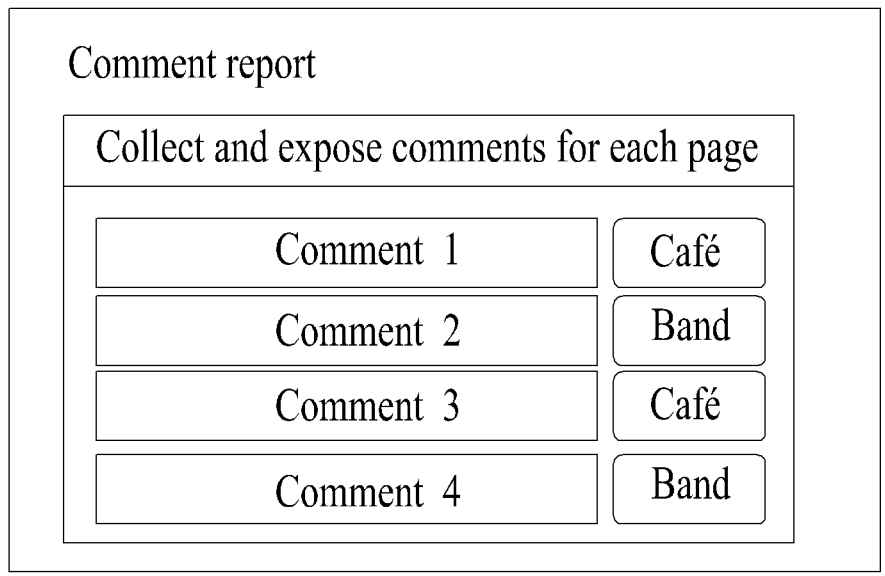

FIG. 10 illustrates an example of a screen for a comment management function according to at least one example embodiment.

Referring to FIG. 10, the processor 220 may provide an interaction function by allowing a comment on a post-type advertisement 810 exposed through the community page 800. A community corresponding to an advertising page may allow a comment on the post-type advertisement 810 that is exposed in the form of a native post on the corresponding community and, when a comment is registered by a community member, may forward the comment to the server 150.

The processor 220 may provide a comment report 1000 on the post-type advertisement 810 through an advertising platform. The processor 220 may collect and display comments forwarded from a corresponding community on the post-type advertisement 810 for each community that is a source of the corresponding comments. The processor 220 may collect and display comments in the order of time at which a corresponding comment is registered through a corresponding page for each advertising page as the comment report 1000. The processor 220 may provide an option capable of arranging comment exposure order in consideration of a community type in addition to a registration time order.

In response to a selection on a specific comment from the comment report 1000, e.g., by the advertiser of the post-type advertisement 810 or those who have access to the comment report 1000, the processor 220 may provide a community outlink for redirection to the post-type advertisement 810 in which the corresponding specific comment is registered. A community corresponding to an advertising page may allow comments of community members on the post-type advertisement 810 and may also allow a comment or a nested comment of an advertiser connected through the outlink, rather than a community member.

Although the interaction function for the post-type advertisement 810 is described, it is provided as an example only. Without being limited thereto, it is possible to provide an interaction function for a comment-type advertisement 820 and a comment report through the interaction function by allowing a nested comment on the comment-type advertisement 820.

The processor 220 may distribute advertising revenue generated in a corresponding community to a manager (individual or some members) of the community.

As described above, according to example embodiments, it is possible to provide a new type of advertising by exposing an advertisement registered to an advertising platform in the form of native content of a corresponding community through the community. According to some example embodiments, it is possible to provide an advertisement of an advertiser as natural content without a sense of heterogeneity by exposing the advertisement of the advertiser in the form of a post or a comment on the community rather than in a separate advertising area. According to some example embodiments, it is possible to effectively verify a user reaction to an advertisement by providing an interaction function through a comment on the advertisement exposed in the form of native content of a community. According to some example embodiments, it is possible to maximize marketing effect by identifying a topic in units of a community, a bulletin board within the community, or a post included in the community or the bulletin board and by using the topic for advertising targeting to target a space suitable for an advertising purpose.

The systems or the apparatuses described herein may be implemented using hardware components, software components, and/or a combination thereof. For example, the apparatuses and the components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions executable through various computer methods. The media may also include, alone or in combination with the program instructions, data files, data structures, and the like. The media may continuously store computer-executable programs or may transitorily store the same for execution or download. Also, the media may be various types of recording devices or storage devices in a form in which one or a plurality of hardware components are combined. Without being limited to a media directly connected to a computer system, the media may be distributed over the network. Examples of non-transitory computer-readable media include magnetic media such as hard disks, floppy disks, and magnetic tapes; optical media such as CD ROM disks and DVD; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of exposing content on an online community page on the Internet in which native content is provided for an online community having a plurality of people with common interests, the native content including at least one of a native post and a native comment related to the native post, the method being performed by a computer system having at least one processor configured to execute computer-readable instructions included in a memory and comprising:

registering, through an interface of an advertising platform implemented by the at least one processor, advertising material including a post type advertising material including a body element and a comment type advertising material including a comment element and targeting information, wherein the advertising material further includes a profile element, and wherein the advertising material is received via a template of the interface implemented by the at least one processor that corresponds to the body element or comment element;

setting at least one of a target page and a target topic based on the targeting information;

determining, based on the at least one of the target page and the target topic, at least one online community page displaying native content including a native post in a native post location and a native comment in a native comment location, the native post corresponding to the post type advertising material and the native comment corresponding to the comment type advertising material; and controlling, by the at least one processor, the advertising material to be exposed on the online community page in a form of at least one of the post type advertising material and the comment type advertising material on the determined at least one online community page, wherein the post type advertising material is exposed on the online community page in a form of the native post and the comment type advertising material is exposed on the online community page in a form of a native comment corresponding to a select native post so that the comment type advertising material corresponds with the select native post, wherein the post type advertising material is exposed in the native post location and the comment type advertising material is exposed in the native comment location by the at least one processor on the online community page rather than in a separate area on the online community page, and wherein the native post and/or the native comment comprises an advertiser profile implemented by the at least one processor corresponding to the profile element, the advertiser profile being selectable via the online community page for redirecting to an outside landing page, wherein the determining comprises determining, based on the target topic, a post related to the target topic as an advertising page using the online community related to the target topic, a bulletin board related to the target topic that is a sub-communication space within the corresponding online community, or a post related to the target topic that is a post included in the online community or the bulletin board, and wherein, with respect to each of the community, the bulletin board, and the post available as the advertising page, a topic of each page is classified through an artificial intelligence (AI)-based machine learning model based on meta information of a corresponding page.

2. The advertising method of claim 1, wherein the at least one of the target page and the target topic is set in a community unit or the bulletin board unit that is a sub-communication space within the online community.

3. The advertising method of claim 1, wherein the controlling comprises controlling the advertising material to be exposed based on a bid ranking on the corresponding community when there is a plurality of advertisements that uses the online community as the target page.

4. The advertising method of claim 1, wherein a comment function is allowed as an interaction function for the advertisement material exposed in the form of the native content.

5. The advertising method of claim 4, wherein the advertising method further comprises receiving a comment on the advertisement material exposed in the form of the native content from the online community and providing a report related to the comment.

6. A non-transitory computer-readable recording medium storing instructions that, when executed by a processor, cause the processor to perform the advertising method of claim 1.

7. A computer system comprising:

at least one processor configured to execute computer-readable instructions included in a memory, wherein the at least one processor is configured to execute a method of exposing content on an online community page on the Internet in which native content is provided for an online community having a plurality of people with common interests, the native content including at least one of a native post and a native comment related to the native post, the method comprising:

a process of registering, through an interface of an advertising platform, advertising material including a post type advertising material including a body element and a comment type advertising material including a comment element and targeting information, wherein the advertising material further includes a profile element, and wherein the advertising material is received via a template of the interface that corresponds to the body element or comment element;

a process of setting at least one of a target page and a target topic based on the targeting information;

a process of determining, based on the at least one of the target page and the target topic, at least one online community page displaying native content including a native post in a native post location and a native comment in a native comment location, the native post corresponding to the post type advertising material and the native comment corresponding to the comment type advertising material; and a process of controlling the advertising material to be exposed on the online community page in a form of at least one of the post type advertising material and the comment type advertising material on the determined at least one online community page, wherein the post type advertising material is exposed on the online community page in a form of the native post and the comment type advertising material is exposed on the online community page in a form of a native comment corresponding to a select native post so that the comment type advertising material corresponds with the select native post, wherein the post type advertising material is exposed in the native post location for the native post and the comment type advertising material is exposed in for the native comment location on the online community page rather than in a separate area on the online community page, and wherein the native post and/or the native comment comprises an advertiser profile corresponding to the profile element, the advertiser profile being selectable via the online community page for redirecting to an outside landing page, wherein the at least one processor is configured to determine, based on the target topic, the advertisement material related to the target topic as an advertising page using a bulletin board related to the target topic that is a sub-communication space within the corresponding online community, or the advertisement material related to the target topic that is a post included in the online community or the bulletin board, and wherein, with respect to each of the online community, the bulletin board, and the post available as the advertising page, a topic of each page is classified through an artificial intelligence (AI)-based machine learning model based on meta information of a corresponding page.

8. The computer system of claim 7, wherein the at least one processor is configured to set at least one of the target page and the target topic in an online community unit or the bulletin board unit that is a sub-communication space within the online community.

9. The computer system of claim 7, wherein the at least one processor is configured to control the advertising material to be exposed based on a bid ranking on the corresponding online community when there is a plurality of advertisements that uses the online community as the target page.

10. The computer system of claim 7, wherein a comment function is allowed as an interaction function for the advertisement material exposed in the form of the native content.

11. The computer system of claim 10, wherein the at least one processor is configured to receive a comment on the advertisement material exposed in the form of the native content from the online community and to provide a report related to the comment.

* * * * *